(12) United States Patent
Zierten et al.

(10) Patent No.: US 10,967,953 B2
(45) Date of Patent: Apr. 6, 2021

(54) COMBINED ACTIVE STICK AND CONTROL BOOST ACTUATOR SYSTEM

(71) Applicant: The Boeing Company, Chicago, IL (US)

(72) Inventors: Daniel T. Zierten, Sewell, NJ (US); Russell J. Enns, Chandler, AZ (US)

(73) Assignee: The Boeing Company, Chicago, IL (US)

( * ) Notice: Subject to any disclaimer, the term of this patent is extended or adjusted under 35 U.S.C. 154(b) by 492 days.

(21) Appl. No.: 15/837,950

(22) Filed: Dec. 11, 2017

(65) Prior Publication Data

US 2019/0176969 A1    Jun. 13, 2019

(51) Int. Cl.
| | |
|---|---|
| *B64C 13/46* | (2006.01) |
| *B64C 13/50* | (2006.01) |
| *B64C 13/04* | (2006.01) |
| *B64C 13/28* | (2006.01) |
| *B64C 13/38* | (2006.01) |
| *B64C 13/10* | (2006.01) |

(52) U.S. Cl.
CPC .......... *B64C 13/46* (2013.01); *B64C 13/042* (2018.01); *B64C 13/0421* (2018.01); *B64C 13/28* (2013.01); *B64C 13/38* (2013.01); *B64C 13/503* (2013.01); *B64C 13/507* (2018.01); *B64C 13/10* (2013.01)

(58) Field of Classification Search
CPC ... B64C 13/0421; B64C 13/28; B64C 13/345; B64C 13/38; B64C 13/46; B64C 13/503; B64C 13/507
See application file for complete search history.

(56) References Cited

U.S. PATENT DOCUMENTS

| | | | |
|---|---|---|---|
| 4,228,386 A | 10/1980 | Griffith | |
| 7,108,232 B2 | 9/2006 | Hoh | |
| 9,381,998 B2 | 7/2016 | Tayalor | |
| 2011/0031346 A1* | 2/2011 | Allieta | B64C 27/56 244/17.13 |
| 2012/0205494 A1* | 8/2012 | Taylor | B64C 13/10 244/223 |

FOREIGN PATENT DOCUMENTS

| | | |
|---|---|---|
| EP | 2311729 A1 | 4/2011 |
| EP | 2543589 A1 | 1/2013 |
| WO | 2015181525 A2 | 12/2015 |

\* cited by examiner

*Primary Examiner* — Nicholas McFall
(74) *Attorney, Agent, or Firm* — Felix L. Fischer

(57) ABSTRACT

A combined active stick and control boost actuator system for a control surface has a control stick engaged to a mechanical flight control structure with a linkage configured to move a control surface. A mechanical interconnect engages the linkage and has a control stick connection. An integrated actuator is separably connected to the mechanical interconnect intermediate the control stick connection and the linkage. A stick force sensor is configured to provide a stick force signal. A flight control system receives the stick force signal and provides an actuator position control signal to the integrated actuator. The integrated actuator moves to a prescribed position in accordance with a force feel profile providing pilot variable tactile cueing and power boost to reduce both fatigue and workload.

20 Claims, 9 Drawing Sheets

COMBINED ACTIVE STICK AND CONTROL BOOST ACTUATOR SYSTEM

BACKGROUND INFORMATION

Field

Implementations shown in the disclosure relate generally to flight control systems for aircraft and more particularly to implementations for pilot active stick control which provides variable tactile feel, power boost for manually controlled mechanical flight controls, manual flight control reversion, autopilot and unmanned flight capability.

Background

Many aircraft which utilize mechanical flight controls do not have a power boost system. This requires the pilot to react all flight loads when moving the pilot control system (grips, sticks, pedals, yokes, etc.), which may result in high pilot work load and fatigue. Such systems typically do not have active stick technology to provide the pilot with tactile feel feedback which is helpful in reducing pilot work load, enhances handling qualities and alerts the pilot when unsafe flight conditions and structural limits are being approached. Existing flight control systems typically have independent actuators dedicated to provide independent functions of autopilot control, power boost, active stick (inceptor) tactile feel/control and unmanned flight control. Typically, an active stick is utilized only with a Fly-by-Wire control system.

Purely mechanical flight control systems provide direct attachment of pilot and co-pilot input control systems through mechanical linkage to a control surface. The pilot physically moves the control surface to the desired position through the linkage. This type of system does not provide autopilot control, power boost, pilot tactile feedback or unmanned flight capability.

Supplementing a basic mechanical flight control system with a hydraulic power boost actuator reduces pilot workload and fatigue. The boost actuator amplifies or boosts the pilot's command force applied to the stick. For smaller aircraft, this type of control system may also include manual reversion in the event power to the actuator is lost. In the event hydraulic power is lost, the pilot force is mechanically transmitted directly through the actuator piston with no power boost. In certain aircraft control loads are so high that a pilot cannot control the aircraft without power boost. In these types of design, the power boost actuator is necessary for flight control and is typically redundant in design (more than one piston).

Fly-by-wire control systems are also employed which include pilot sticks with position sensors, flight control computers and redundant powered actuators to move the various surfaces. Outputs from the stick position sensors are transmitted to the flight control computers which then provide a signal to the powered actuator for positioning control. The actuators are typically provided with hydraulic and/or electrical power to generate the desired forces. This design reduces pilot fatigue as the pilot does not react aerodynamic loads, mechanical control friction/damping, inertia, or other loads in the control system. As this type of system typically does not include manual reversion, it depends on complex redundant electronics and software/firmware to accommodate failures.

All of these systems can include an additional autopilot actuator. The autopilot actuator typically has a clutch and slip clutch (or spring bungee) to ensure the pilot can overcome a failure in the autopilot system which fights the pilot. This system does not provide pilot tactile feedback nor unmanned flight capability.

Active sticks (inceptors) may be added to fly-by-wire systems with stick position sensors, stick position force sensors and stick driver motors. These sensors and motors provide the pilot tactile feel and can also be used for autopilot control. The stick sensors are transmitted to the flight control computers which then provide a signal to the powered actuators for positioning control.

Exemplary assisted actuation systems with active sticks (inceptors) are disclosed in U.S. Pat. No. 7,108,232 entitled Helicopter Force-Feel and Stability Augmentation System with Parallel Servo Actuator and U.S. Pat. No. 9,381,998 entitled Tactile Cueing Apparatus. These prior art systems require separate actuators for inceptor active tactile feel and control system power boost.

SUMMARY

Exemplary implementations provide a combined active stick and control boost actuator system for a control surface, the system having a control stick engaged to a mechanical flight control structure with a linkage configured to move the control surface. A mechanical interconnect engages the linkage and has a control stick connection. An integrated actuator is separably connected to the mechanical interconnect intermediate the control stick connection and the linkage. A stick force sensor is configured to provide a stick force signal responsive to force exerted on the control stick. A flight control system receives the stick force signal and is adapted to provide an actuator position control signal to the integrated actuator whereby said integrated actuator moves to a prescribed position in accordance with a force feel profile. An actuator position sensor provides an actuator position signal to the flight control system and the flight control system is further adapted to close a position loop responsive to the actuator position signal.

The exemplary implementations allow a method for control of a control surface. Stick force is sensed by a stick force sensor and an input force signal is generated. A force feel profile is applied and an actuator position command is provided. An actuator dynamic position command is summed with a negative actuator position signal to provide a position error command to an actuator controller. The actuator controller then outputs an actuator position control signal. An integrated actuator moves responsive to the actuator position control signal providing a torque or force output. That torque or force output results in physical acceleration force on the system mass with associated velocity and position changes. The actuator position sensor provides an updated actuator position signal to close a position loop.

BRIEF DESCRIPTION OF THE DRAWINGS

The features, functions, and advantages that have been discussed can be achieved independently in various implementations or may be combined in yet other implementations further details of which can be seen with reference to the following description and drawings.

DETAILED DESCRIPTION

The exemplary implementations described herein provide a combined active stick and control boost actuator system giving active stick (inceptor) functionality for pilot tactile cuing and power boost functionality to compensate for control surface loads to isolate the pilot control stick through an integrated actuator mechanically connected to an unboosted mechanical flight control system.

For purpose of descriptions herein a single axis of control is depicted for simplification, whereas there are multiple axes of control (e.g., collective, pitch, roll and yaw) with numerous control surfaces each of which may employ the implementations disclosed. The term "stick" as used herein means any pilot control device used to control the flight path of the aircraft (i.e., yoke, rudder pedals, or other control input device or inceptor).

Figure 1:
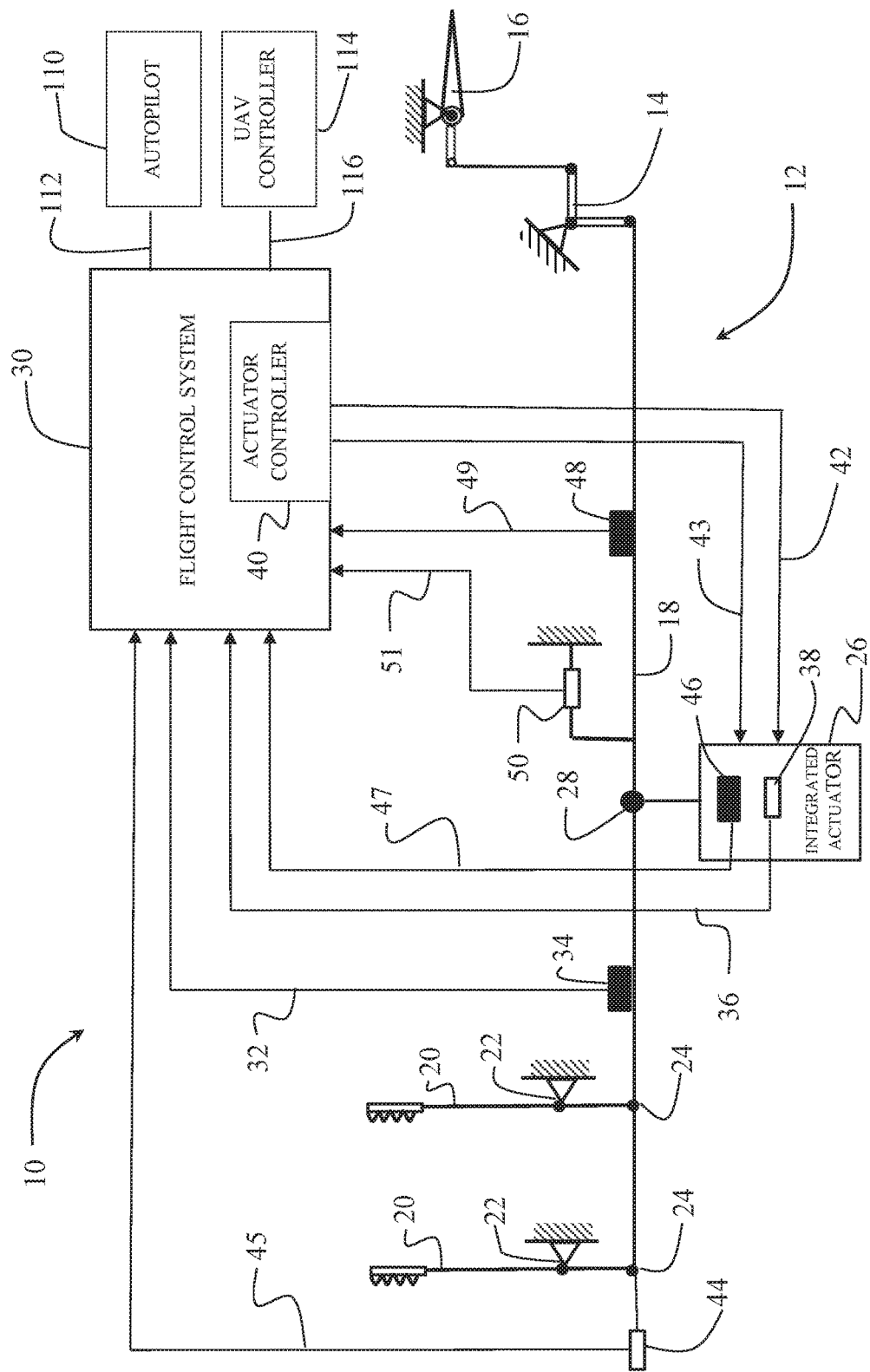
FIG. 1 is a schematic representation of an exemplary implementation of a combined active stick and control boost actuator system.

Referring to the drawings, FIG. 1 shows a schematic representation of an exemplary implementation of a combined active stick and control boost actuator system 10. The system 10 includes a mechanical flight control structure 12 which employs a linkage 14 connected to manipulate a control surface 16. A mechanical interconnect 18, which may be cables or one or more control rods, connects one or more control sticks 20 (a pilot control stick and a co-pilot control stick for the implementation shown) to the linkage 14. In mechanical flight control mode, pilot movement of a control stick 20, acting as a lever about pivot point 22 to a stick connection 24 on mechanical interconnect 18, translates mechanical interconnect 18 to position linkage 14 for a desired position of control surface 16.

An integrated actuator 26 is connected to the mechanical interconnect 18 with a mechanical coupler 28 intermediate the stick connection 24 and the linkage 14. Connection of the actuator 26 to the mechanical coupler 28 is separable or removable as will be described in greater detail subsequently. The mechanical coupler 28 may be a rotary connection or lever assembly depending on the form of the integrated actuator 26. A flight control system 30 receives an input force signal 32 from a stick force sensor 34 connected to sense force applied to the mechanical interconnect 18 by the control stick 20. The flight control system 30 also receives an actuator position signal 36 from an actuator position sensor 38 associated with the integrated actuator 26. An actuator controller 40 in the flight control system 30 provides an actuator position control signal 42 to the integrated actuator 26 responsive to the input force signal 32 and actuator position signal 36. Response of the integrated actuator 26 to the actuator position control signal 42 results in an applied force at the mechanical coupler 28 by the integrated actuator 26 that provides power boost through the mechanical interconnect 18 to the control surface 16 via the linkage 14 while simultaneously providing tactile feedback to the control stick 20 through the mechanical interconnect 18. The actuator controller may also provide a disconnect signal 43 upon failure or jam detection in the integrated actuator 26. Jam mitigation is accomplished by using a disconnect device (e.g., decoupler, clutch, shear pin or other comparable device) which separates the integrated actuator 26 from the mechanical coupler 28 and results in the system reverting to a manual direct mechanical control mode which has no tactile cueing and no power boost operation as will be described in greater detail subsequently.

Additional input to the flight control system 30 may be provided by a stick position sensor 44 inputting a stick position signal 45 which supplements the data provided by the stick force sensor 34 by adding physical position of the stick as well as applied force. Similarly, an actuator force sensor 46 may be employed to provide an actuator force signal 47 for information on force or torque being exerted by the integrated actuator 26 on the mechanical coupler 28. Additionally, a control surface force sensor 48 sensing force imposed on in the mechanical flight control structure 12 by the control surface 16 may provide a control surface force signal 49. Additional position sensing may be provided by a control linkage position sensor 50 sensing actual position of the mechanical interconnect 18, in the implementation shown in the drawings, to provide a linkage position signal 51.

Figure 2:
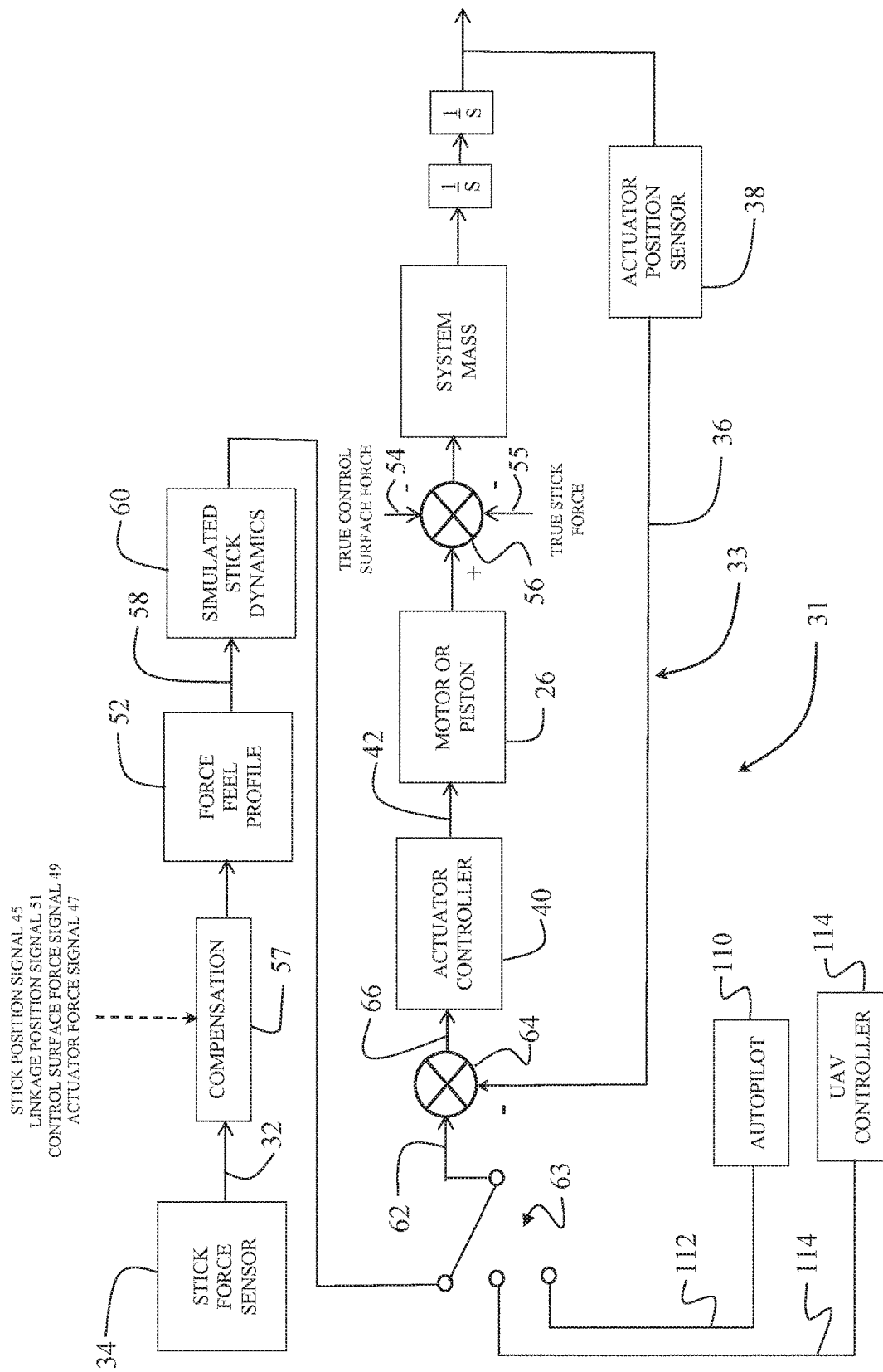
FIG. 2 is a servo loop diagram of the control elements for the exemplary implementation.

The flight control system 30 employs a basic servo loop 31 as shown in FIG. 2. The servo loop 31 may be implemented in software routines in a general-purpose microprocessor, as programmable gate arrays, firmware or in other formats in combined or distributed modules (generally referred to herein as "modules). The servo loop 31 incorporates a module which receives or reads stick force signal 32 from the stick force sensor 34 and commands the integrated actuator 26 through actuator controller 40 to a prescribed position in accordance with a selected force feel profile 52 (to be discussed in detail with respect to FIG. 3 subsequently). The integrated actuator 26 and flight control system 30 then close a position loop 33 using actuator position signal 36 from the actuator position sensor 38 which results in very little stick position error even as control surface loads, represented by true control surface force 54, and pilot applied stick force 55 are applied to the entire mechanical control system 12, 14, 16, 18 and 20 as represented by summer 56. When the true control surface force 54 and true stick force 55 are subtracted from the motor output force at summing junction 56, the residual force accelerates the mass of the mechanical control system 12, which is then double integrated (1/S^2) resulting in the actuator position as read by the position sensor 38.

The stick force sensor command (stick force sensor signal 32) may be supplemented by additional modules for compensation 57 prior to converting the force command to an actuator force feel position command 58 using the selected force feel profile 52. Compensation 57 employing the stick position signal 45, actuator force signal 47, control surface force signal 49 and control linkage position signal 51 can be used to adjust for true system inertial effects, actuator compliance, linkage compliance, hysteresis, free play, damping, signal noise, unwanted feedback and other non-linearities within the overall mechanical, hydraulic and/or electrical system which improves dynamic stability, reduces stick position error and provides enhanced force feel characteristics (performance).

An actuator force feel position command 58 (including compensation 57), is then employed to compute desired stick dynamics 60 to provide an actuator dynamic position command 62 which provides the desired simulated (artificial) inertial and damping stick feel. In exemplary implementations a second order dynamic model is used to create the desired simulated stick dynamics. The actuator dynamic position command is then provided through an actuator position summing junction 64 resulting in a position error signal 66 transmitted to the actuator controller 40 which provides motor current or hydraulic actuator pressure, as will be described subsequently, as the actuator position control signal 42 to the integrated actuator 26. Compensation and simulated stick dynamics can be combined in alternative implementations and injected at alternate positions within the servo loop 31 (in an alternative example implementation at the actuator position summing junction 64). Basic closure of the position loop 33 can alternatively use stick position signal 45 or control linkage position signal 57 depending on system impedance considerations.

Figure 3:
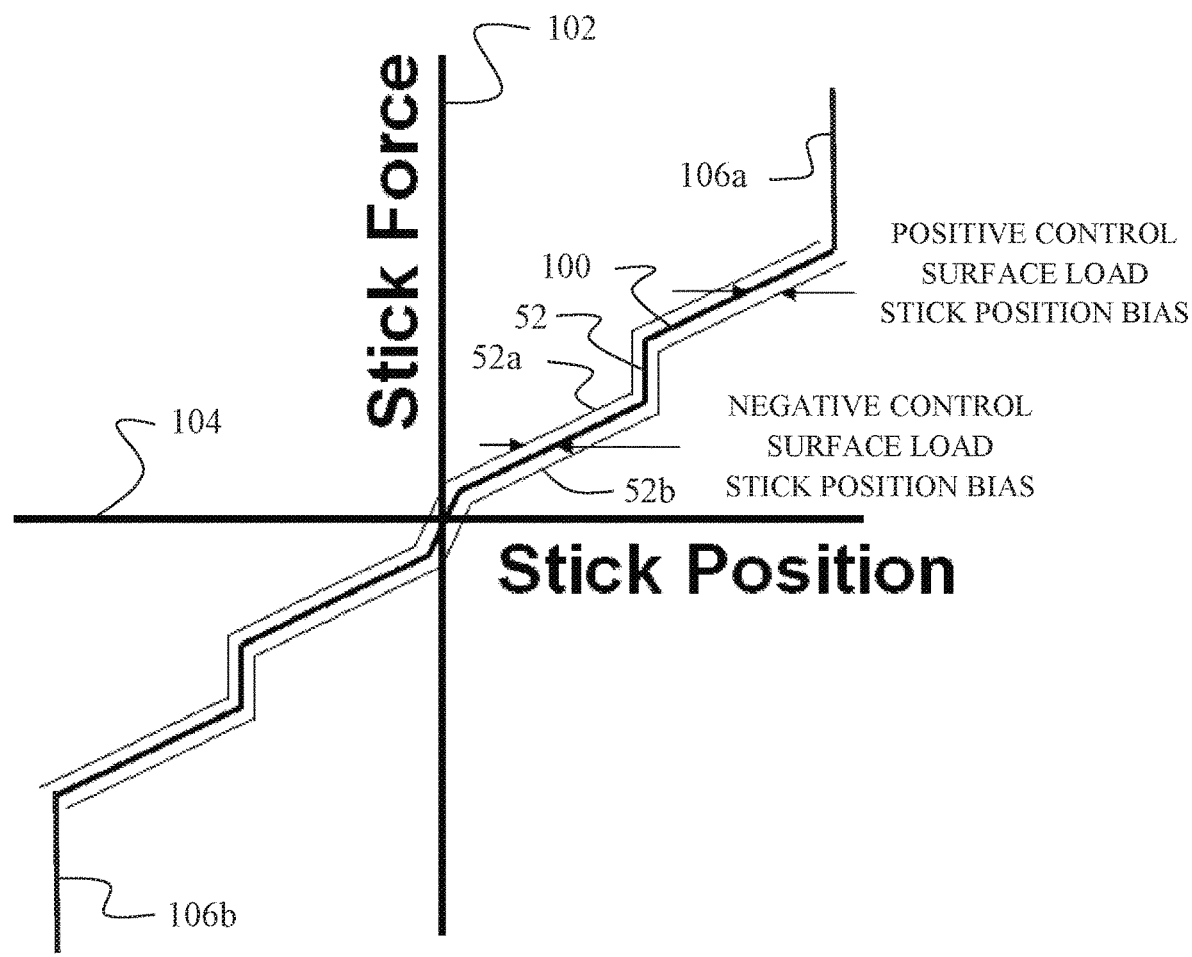
FIG. 3 is a graphical representation of a stick force vs. stick position profile employed by the exemplary implementations.

As seen in FIG. 3, the servo loop 31 provides a stick "force feel" relationship through one or more modules represented by force-feel profile 52. The force-feel profile is adjustable in real time based on the specific applications needs and flight conditions. For example, the flight control system 30 may warn the pilot about exceeding a certain position due to an aircraft limit (e.g. engine torque) by adjusting the force feel profile 52 to present a soft-stop 100 at that position. Other examples include offsets, gain changes, soft stops and hard stops.

When considering the effects of the external loads, there may be small static position errors in the stick 20 and associated stick position signal 45 depending on how the servo loop is closed. For example, when considering the case where the pilot lets go of the stick (stick force 102 equals zero) and given the stick force feel profile 52 as shown in FIG. 3, the integrated actuator 26 will drive the stick position 104 to zero. As an external control surface load is applied in a polarity which tends to move the stick position in a negative direction, a very small negative stick motion will occur which develops enough positional error signal to react the flight load and hold the stick near zero. FIG. 3 shows an exaggerated diagram which demonstrates how the external negative control surface load will slightly bias the force feel profile left as represented by profile 52a. The pilot can oppose the control surface load by applying a positive stick load which will move the actuator in a positive direction or can add a negative stick load which will move the actuator in the negative direction following the biased force feel profile. Conversely, if the control surface load is in the positive direction, the force feel profile will be shifted right as represented by profile 52b. This arrangement of servo loop 31 essentially provides the desired force feel relationship while the integrated actuator 26 opposes nearly the entire load from control surface 16 imparted to the mechanical flight control structure 12 thereby providing the power boost functionality. An alternate solution to achieve near zero stick position error is to use an integrator within the servo loop 31 which continuously strives to drive the actuator position error 66 to zero.

From a high frequency dynamic load perspective, both approaches will include some dynamic stick position error which can result in a small amount of stick vibration (control surface load feed through). High frequency helicopter rotor dynamic loads, for example, are physically filtered out due to the relatively high impedance created by the inertia of the mechanical flight control structure 12. The pilot provides the reaction force through the stick 20 to this residual load feedback when controlling the aircraft using the mechanical flight control system. With the addition of the inertia of the combined active stick and control boost actuator system 10, the control surface load feedback (or feed through) to the stick 20 is further reduced. As such, dynamic load feed back to the stick 20 is minimized resulting in a desirable force feel.

The Actuator controller 40 of the implementation shown may be integrated with the flight control system 30 within an aircraft flight control computer, or may be a separate microprocessor and support circuitry dedicated to and residing within the integrated actuator 26 or may have shared elements in both depending on overall system architecture. For example, the aircraft flight control computer may compute the force feel profile based on aircraft state sensors (i.e., altitude, airspeed, rates, etc.) while the actuator controller 40 located inside of the integrated actuator 26 performs the positional servo loop closure and actuator fault detection and isolation as a smart actuator system.

Several approaches are possible to detect a jam in the integrated actuator 26. A simple approach is to declare a jam if the input force signal 32 exceeds a maximum anticipated stick force threshold, either positive threshold 106a or negative threshold 106b as seen in FIG. 2 (i.e. the pilot cannot move the stick). This approach only needs to use the stick force sensor 34. Upon exceeding the threshold 106a, 106b, flight control system 30 activates the disconnect signal 43 to remove the integrated actuator 26 from the system.

A more explicit method is to compare the output force (torque) of the integrated actuator 26, actuator force signal 47 from the actuator force sensor 46, to the sum of the stick force (input force signal 32), and control surface loads, control surface force signal 49. In this case, three force sensors, the stick force sensor 34, actuator force sensor 46 and control surface force sensor 48 are employed. Since the integrated actuator 26 output force (torque) should never exceed the maximum anticipated control surface load plus the maximum anticipated stick load, this provides a significant threshold margin to prevent nuisance failures.

Another approach is to declare a jam for electric motor implementations of the integrated actuator 26, described subsequently, if the motor output current exceeds a maximum anticipated control surface load (which includes inertial acceleration) as indicated by the control surface force signal 46 plus a maximum anticipated stick load as indicated by the input force signal 32. This approach does not require any additional sensors (as current is commonly available for motor loop closure and current monitoring).

Yet another approach is to compare the actuator dynamic position command, actuator position control signal 62, to the measured actuator position signal 36 (or control linkage position signal 51). This approach must consider worst case normal positional error which results from any positional tracking error of the integrated actuator 26 under the effects of stick and control surface loading (e.g., force used to accelerate).

Upon detection of a jam condition using any of the exemplary detection methods, the flight control system 30 will issue the disconnect signal 43 through the actuator controller 40 allowing reversion to a purely mechanical flight control system with direct connection of the control stick 20 through the mechanical flight control structure 12 to the control surface 16.

Figure 4A:
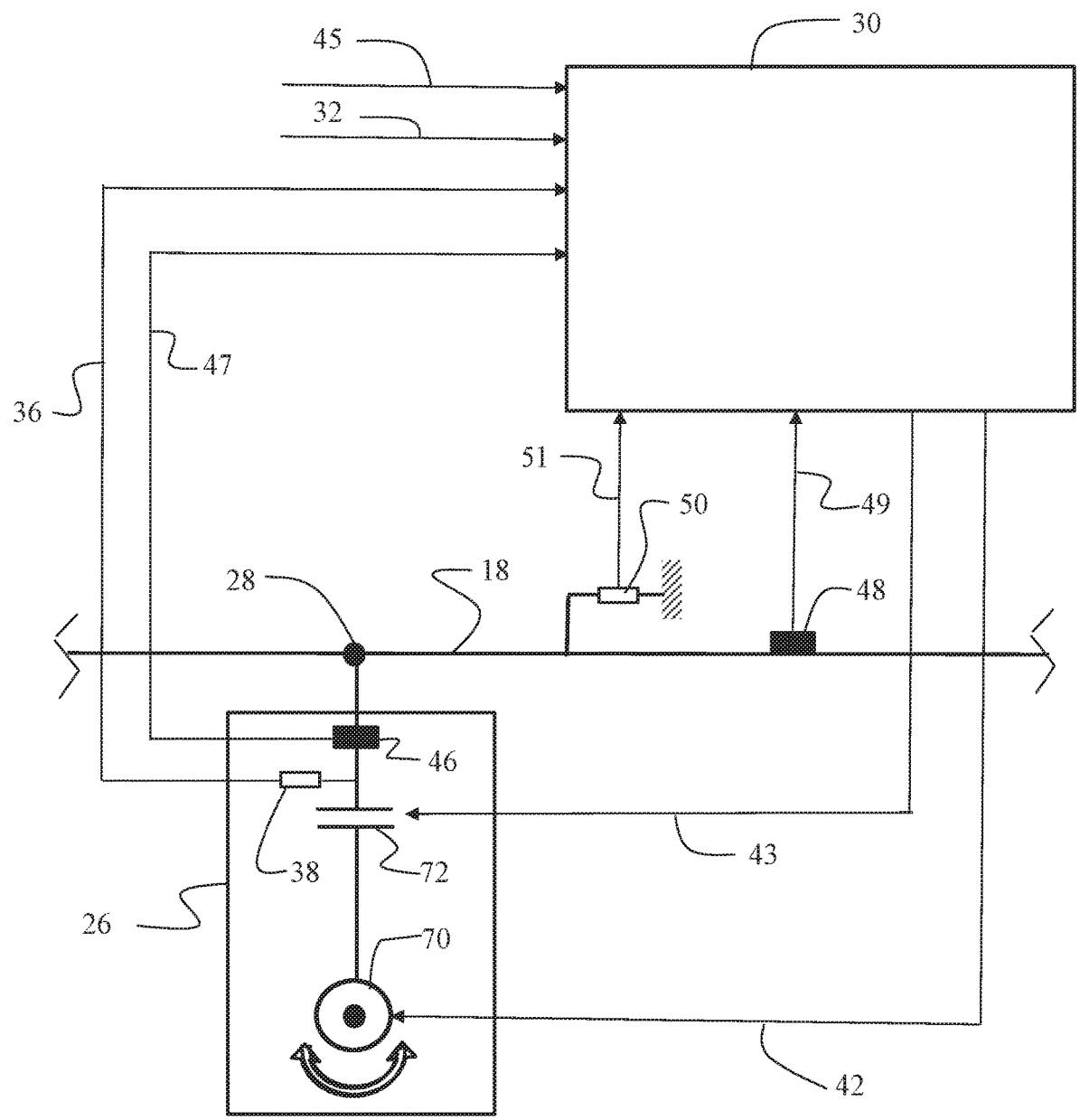
FIG. 4A is a schematic representation of a single channel electric actuator implementation.

The combined active stick and control boost actuator system 10 in a first exemplary implementation may employ an electric motor 70 (with associated, gearing, sensors and other components) in the integrated actuator 26 as seen in FIG. 4A. The actuator position control signal 42 for the electric motor 70 is a controlled current input providing bidirectional rotation of the electric motor 70. The disconnect signal 43 disengages a clutch 72 to physically disconnect the electric motor 70 from the mechanical coupler 28 upon identification of a fault or jam condition in the electric motor 70 thereby allowing the mechanical flight control structure 12 to operate with direct input from the control stick 20 through mechanical interconnect 18.

Figure 5A:
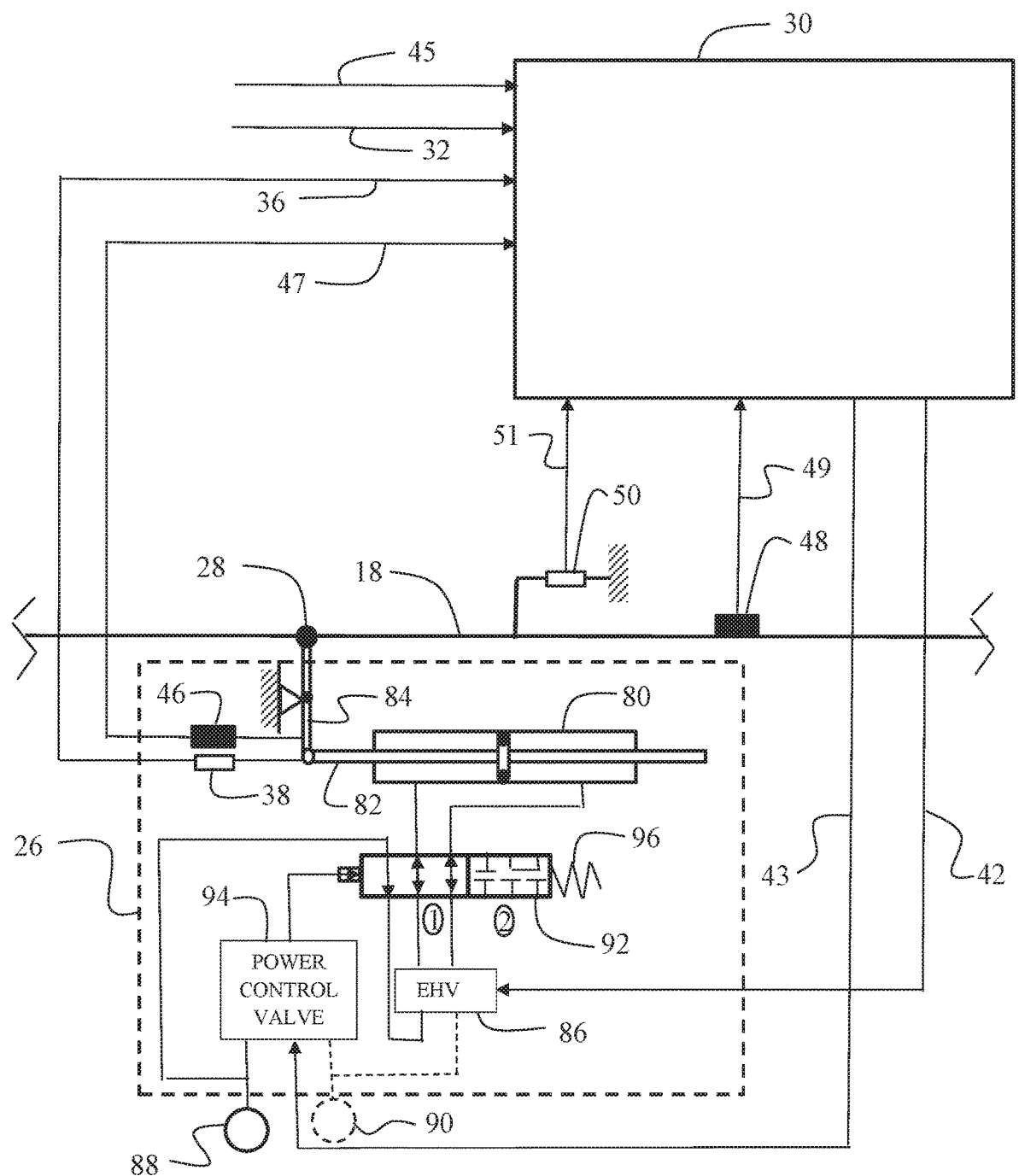
FIG. 5A is a schematic representation of a single channel hydraulic actuator implementation.

The combined active stick and control boost actuator system 10 in a second exemplary implementation may employ hydraulic actuation in the integrated actuator 26. A seen in FIG. 5A, a hydraulic cylinder 80 with an actuation rod 82 connects through a pivoted lever 84 to the mechanical coupler 28 (or directly to the mechanical interconnect 18 as a replacement for the mechanical coupler device). An electro hydraulic servo valve (EHV) 86 receives the actuator position control signal 42 from the flight control system 30 and controls pressure and flow from a hydraulic pump (or other pressure source) 88 with a return 90 through a shutoff-bypass valve 92 to the hydraulic cylinder 80. A direct drive servo valve (DDV) may be employed as an alternative to the EHV 86. A power control valve 94 receives the disconnect signal 43 and, upon activation if a failure should occur, releases pressure from the shutoff-bypass valve 92 allowing spring 96 to shift the shutoff-bypass valve 92 from normal operating position 1 to shutoff-bypass position 2 allowing free translation of the actuation rod 82 within the cylinder as is known in the art.

The implementations of the combined active stick and control boost actuator system 10 as disclosed is additionally particularly attractive for control of autopilot systems or unmanned air vehicle (UAV) operation of the aircraft. As seen in FIG. 1, an autopilot 110, which may incorporate self-contained Attitude Heading Reference System (AHRS), or may rely on existing sensors in the aircraft as is known in the art. The autopilot 110 provides, when engaged, an autopilot control input 112 to the flight control system 30 which takes the place of the stick force signal 32 in the servo loop 31. No additional actuators or sensors are required and the combined active stick and control boost actuator system 10 will provide input to the control surface 16 transparently to the input signal source, autopilot control input 112 or stick force signal 32. Pilot applied priority override stick force as transmitted by the stick force signal 32 may be provided as a failure mode protection until the autopilot is disengaged automatically or by pilot selection.

Similarly, the control input for the control surface 16 may be provided by a UAV controller 114 which provides a UAV control input 116. The UAV controller may be wirelessly connected to a remote control station or may operate autonomously as is known in the art. The aircraft may further be selectively operated in a manned mode with a pilot operating the stick 20 to provide the stick force signal 32. This arrangement also provides an option for optionally piloted aircraft control (manned and unmanned) with minimal changes to the flight control system 30. Prioritization of the input signals may be accomplished by a mode selection switch 63.

Figure 4B:
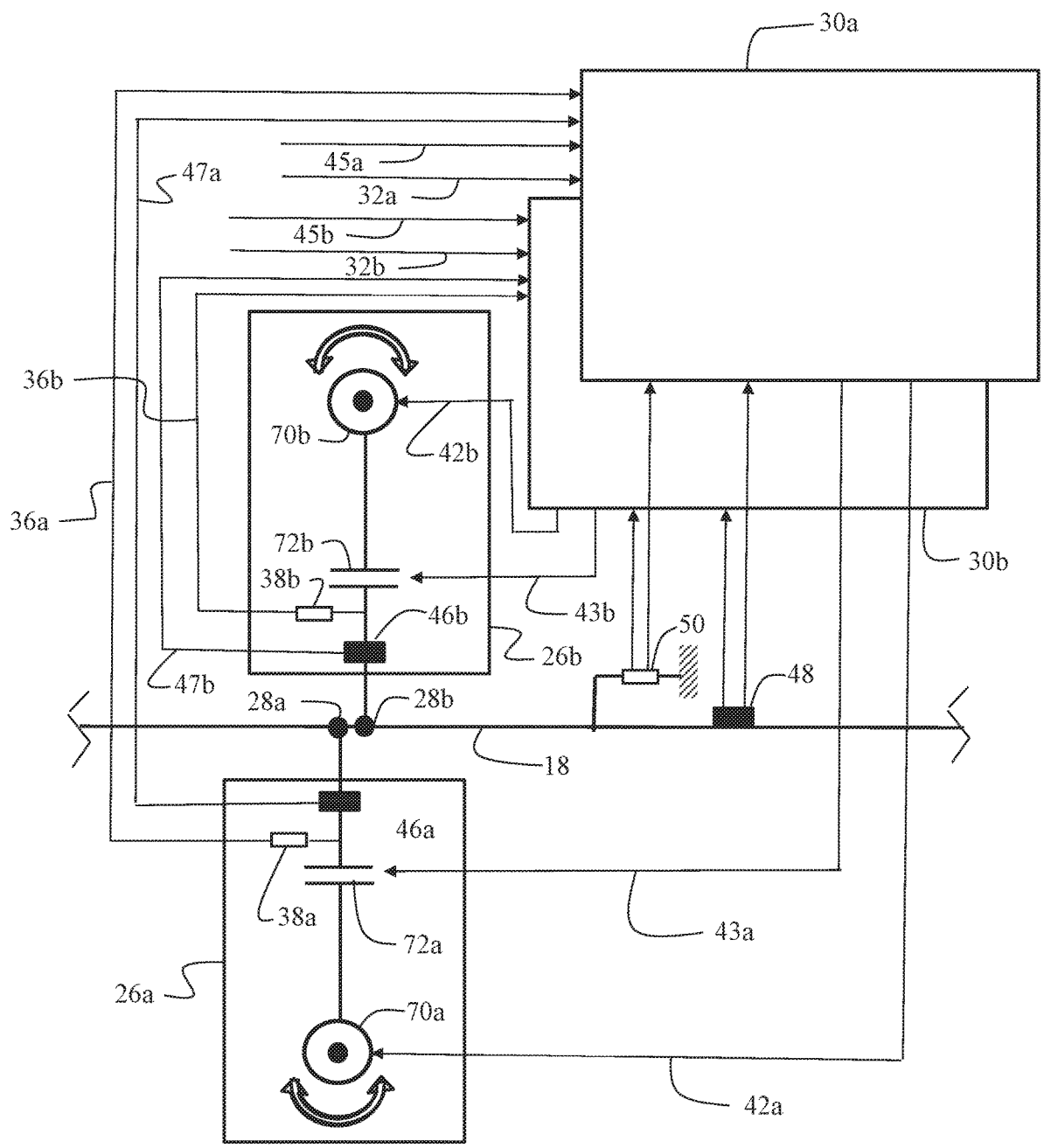
FIG. 4B is a schematic representation of a dual channel electric actuator implementation.

To enhance system safety and minimize failure transients of the combined active stick and control boost actuator system 10, redundancy may be provided in the integrated actuator 26 and other elements of the system including the flight control system 30. As seen in FIG. 4B for an electromechanical system as described with respect to FIG. 4A, dual flight control systems 30a and 30b may be employed. Actuator position control signals 42a and 42b for the electric motors 70a and 70b of integrated actuators 26a and 26b are a controlled current input providing bidirectional rotation of the electric motors. Duplication of stick force sensors to provide stick force signals 32a and 32b to flight control systems 30a and 30b respectively may be provided. Similarly, duplication of the stick position sensors to provide redundant stick position signals 45a and 45b to flight control systems 30a and 30b may be provided. Disconnect signals 43a and 43b, generated by flight control systems 30a and 30b responsive to a fault or jam detection as previously described, disengage clutches 72a and 72b to selectively physically disconnect one or both integrated actuators 26a and 26b from the engagement devices 28a and 28b upon identification of a fault or jam condition in the associated electric motor thereby allowing the motor which remains engaged to continue system operation. While mechanical couplers 28a and 28b are shown as redundant in the exemplary implementation of FIG. 4B, a single mechanical coupler 28 may be employed with both integrated actuators 26a and 26b commonly connected and integrated into a single integrated actuator assembly with a single clutch. If both integrated actuators should jam, disconnection of both motors allows the mechanical flight control structure 12 to operate unboosted and without force feel with direct input from the control stick 20 through mechanical interconnect 18 as previously described. In the autopilot mode, the redundant actuators can also provide stability augmentation control.

Figure 5B:
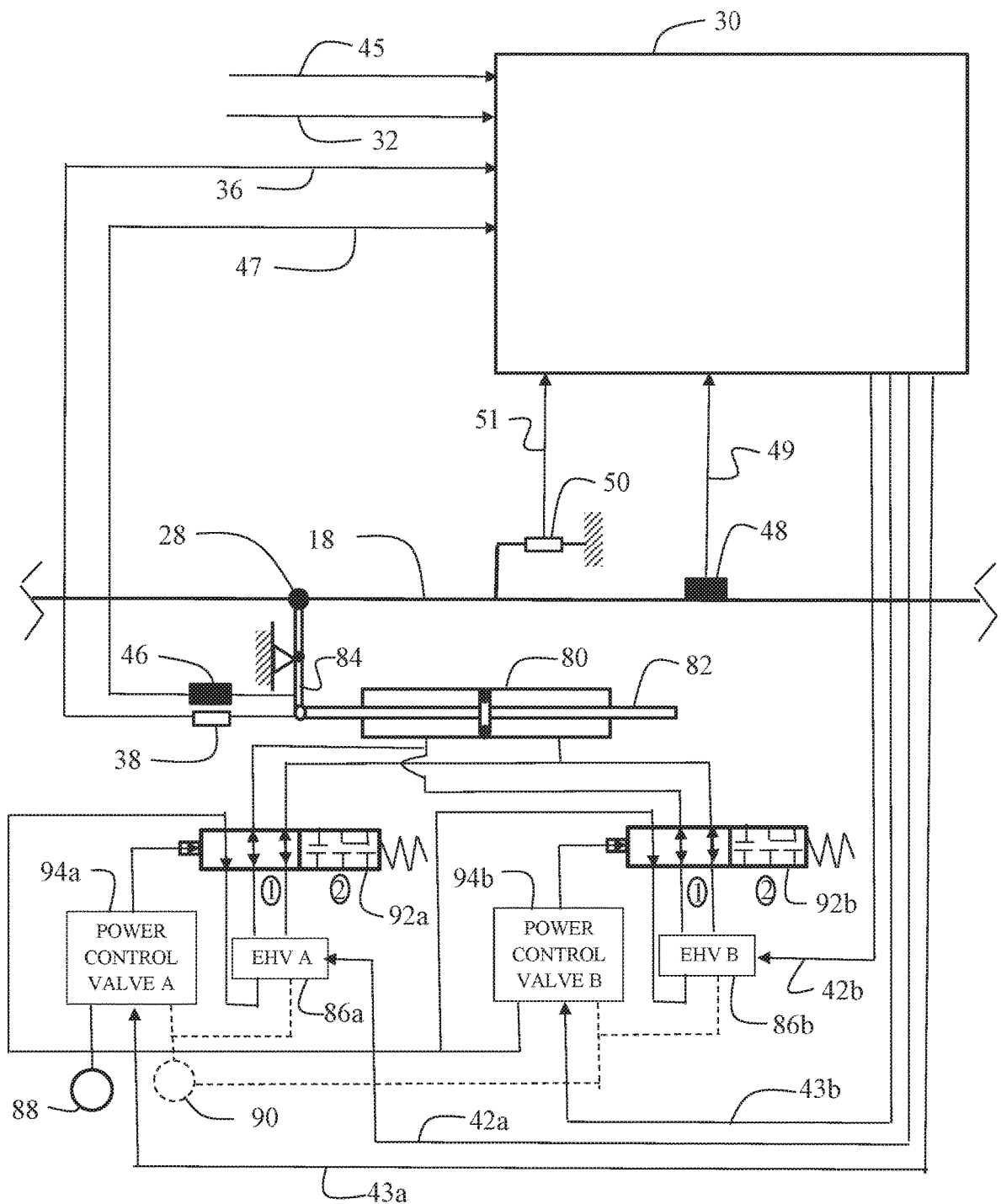
FIG. 5B is a schematic representation of a dual control channel with single hydraulic actuator implementation.
Figure 5C:
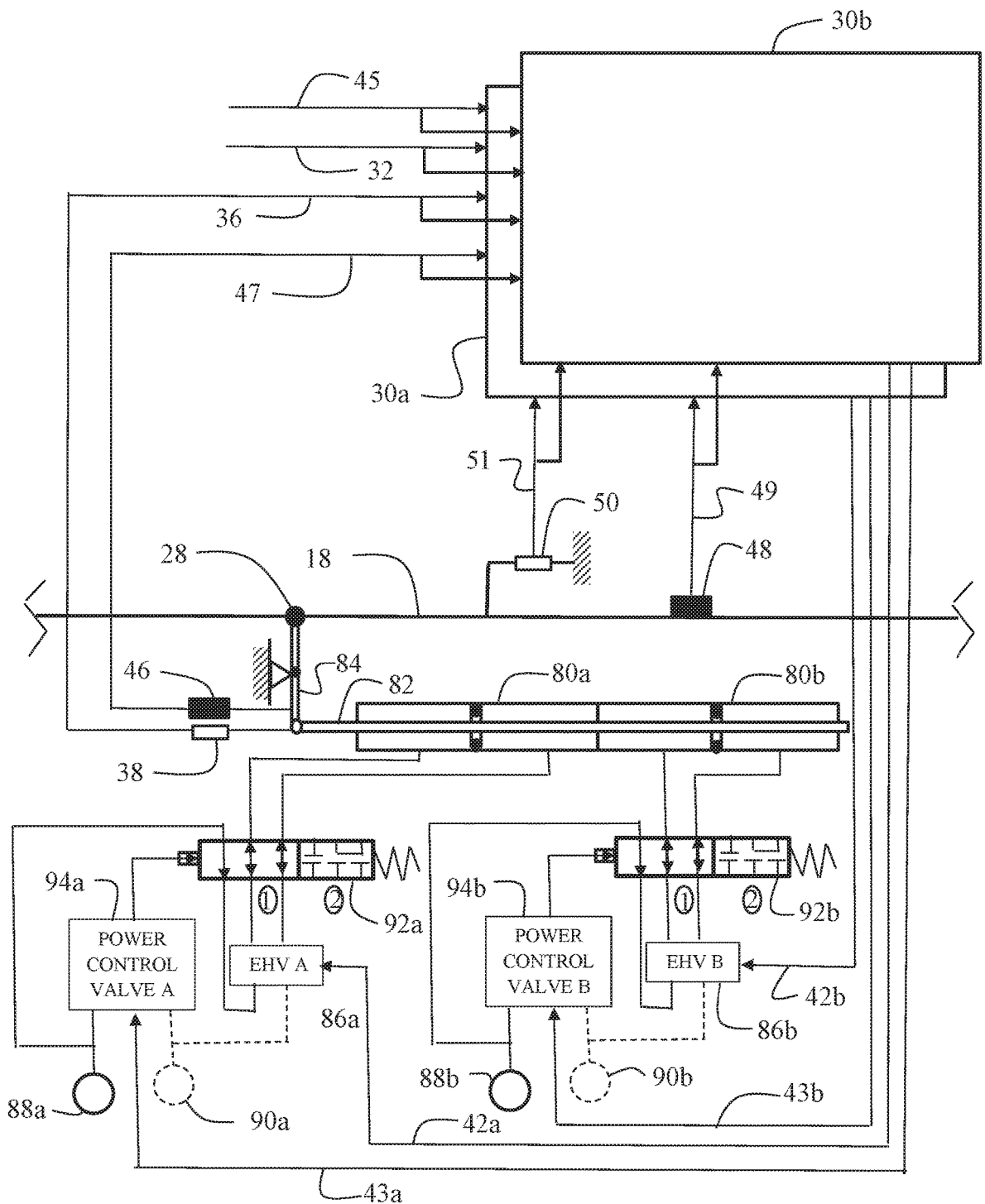
FIG. 5C is a schematic representation of an alternate dual control channel and dual hydraulic actuator implementation; and, FIG. 6 is a flow chart showing a method for operation of a helicopter control system employing the disclosed implementations.

Similarly, redundancy in a hydraulic implementation of the combined active stick and control boost actuator system 10 may also be desirable to minimize failure transients and provide reliable autopilot and unmanned aircraft capability. Several approaches are available as shown in FIGS. 5B and 5C. The implementation shown in FIG. 5B is partially redundant using a single hydraulic power source 88 and 90 and a single hydraulic cylinder 80 and piston 84. However, redundant actuator control can be provided by redundant EHVs 86a and 86b. In certain implementations redundancy of the flight control system 30 and position and force sensors may be also be preferable to insure complete independent controls. Dual power control valves 94a and 94b are used to engage/disengage each channel by shifting the redundant actuator bypass valves 92a and 92b. These redundant actuator control elements minimize channel failure transients and allow continued operation on the remaining good channel. The hydraulic decoupling or bypass function may be more easily implemented and may weigh less than an electromechanical actuator clutch.

An alternative implementation for hydraulic integrated actuator redundancy is shown in FIG. 5C. This approach provides reliable autopilot and unmanned aircraft capability as the actuator can operate using either the A or B channel. Redundant hydraulic power systems are provided by 88a, 88b, 90a and 90b and redundant actuator control is provided by redundant EHVs 86a and 86b. Redundant power control valves 94a and 94b are used to engage/disengage each channel as shown in FIG. 5B. Separate hydraulic cylinders 80a and 80b with associated pistons are driven by EHV valves 86a and 86b. The redundant cylinders can be tandem as shown (two or more power stages in line with single rod 82) or parallel (two or more power stages side by side with separate rods engaging pivoted lever 84).

Figure 6:
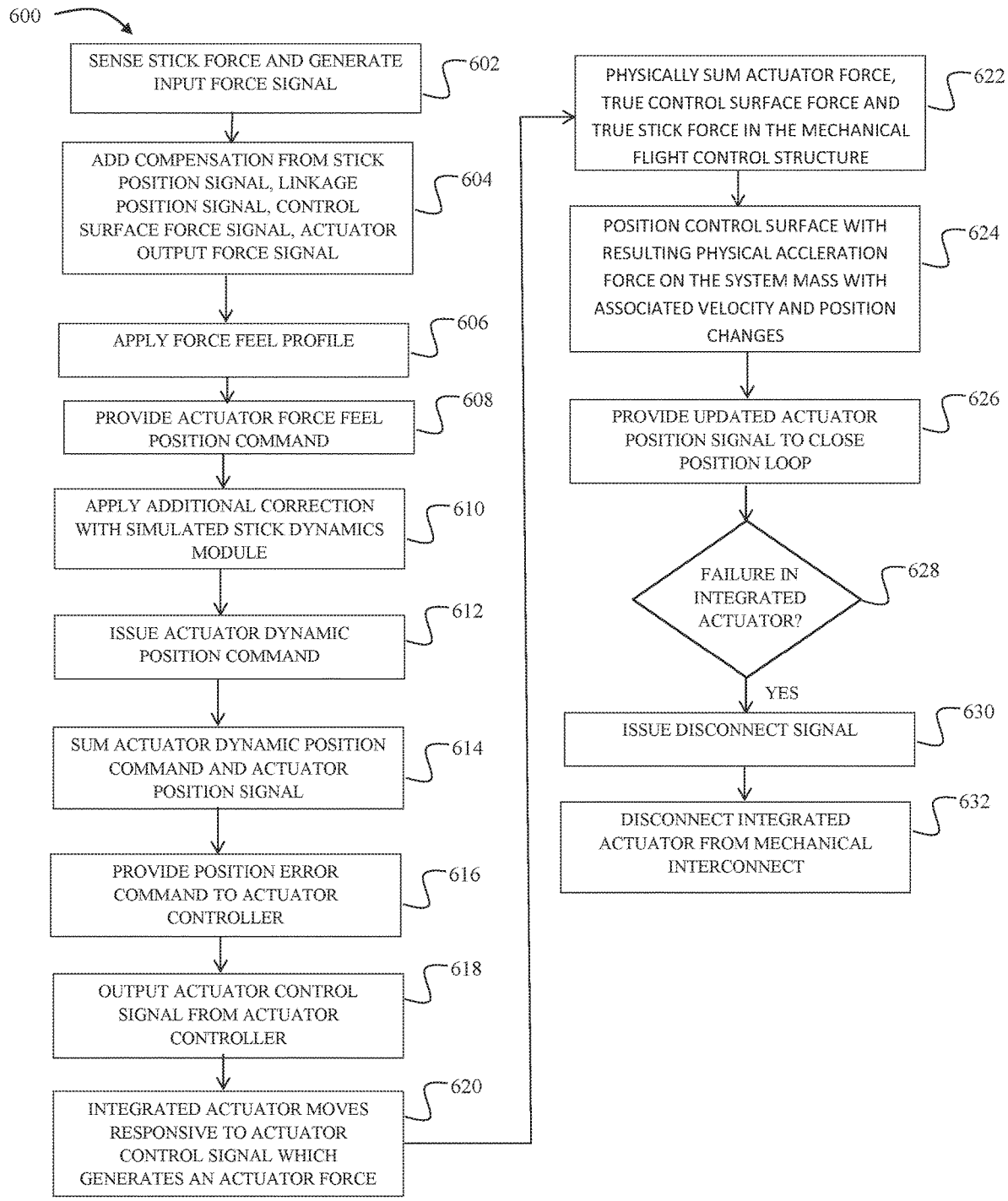

The implementations of the combined active stick and control boost actuator system 10 provide a method 600 for control of a control surface 16 as shown in FIG. 6. Stick force is sensed by a stick force sensor 34 and an input force signal 32 is generated, step 602, and provided to a flight control system 30. Compensation using one or more of a stick position signal 45, a linkage position signal 51, a control surface force signal 49 or an actuator output force signal 47 is applied through a compensation module 57, step 604. A force feel profile 52 is applied, step 606, and an actuator force feel position command 58 is provided, step 608. A simulated stick dynamics module 60 may apply additional correction, step 610, and issue the actuator dynamic position command 64, step 612, which is then summed with the actuator position signal 36, step 614, to provide a position error command 64 to the actuator controller 40, step 616. The actuator controller 40 then outputs the actuator position control signal 42, step 618. The integrated actuator 26 moves responsive to the actuator position control signal, step 620, providing a torque or force output to the mechanical interconnect 16. That torque or force output physically sums with the true control surface force 54 and true stick force 55 as carried in the mechanical flight control structure 12, step 622, which results in physical acceleration force on the system mass with associated velocity and position changes, step 624 to the position the control surface 16. The actuator position sensor 38 then provides an updated actuator position signal 36, step 626, to close the position loop 33. Upon detection of a failure in the integrated actuator 26, step 628, the flight control system 30 issues a disconnect signal 43, step 630, to disconnect the integrated actuator from the mechanical interconnect 18, step 632.

Having now described various implementations in detail as required by the patent statutes, those skilled in the art will recognize modifications and substitutions to the specific implementations disclosed herein. Such modifications are within the scope and intent of the present invention as defined in the following claims.

What is claimed is:

1. A combined active stick and control boost actuator system for a control surface, the system comprising:
   a control stick engaged to a mechanical flight control structure having a linkage configured to move the control surface;
   a mechanical interconnect connected to the linkage and having a control stick connection whereby motion of the control stick translates the mechanical interconnect;
   an integrated actuator separably connected to the mechanical interconnect intermediate the control stick connection and the linkage;
   a stick force sensor configured to provide an input force signal responsive to force exerted on the control stick;
   a flight control system receiving the input force signal and adapted to provide an actuator position control signal to the integrated actuator the flight control system including a servo loop receiving the input force signal from the stick force sensor, an actuator force signal provided by an actuator force sensor, a control surface force signal provided by a control surface force sensor and feedback from a position loop using an actuator position signal from an actuator position sensor, and summing a true control surface force and a true stick force to provide an actuator force signal whereby said integrated actuator moves to a prescribed position in accordance with a force feel profile, said flight control system further adapted to provide a disconnect signal to the integrated actuator, said integrated actuator adapted to disconnect from the mechanical interconnect responsive to the disconnect signal.

2. The combined active stick and control boost actuator system as defined in claim 1 wherein the integrated actuator comprises an electric motor, said flight control system includes an actuator controller to provide the actuator position control signal and said actuator position control signal comprises a motor current.

3. The combined active stick and control boost actuator system as defined in claim 2 wherein the integrated actuator is connected to the mechanical interconnect with a mechanical coupler, and the integrated actuator further comprises a clutch intermediate the motor and mechanical coupler, said clutch operable to disconnect the motor from the mechanical coupler responsive to the disconnect signal.

4. The combined active stick and control boost actuator system as defined in claim 3 further comprising a second integrated actuator having a second motor and connected to the mechanical interconnect with a second mechanical coupler, and the second integrated actuator further comprising a second clutch intermediate the second motor and second mechanical coupler, said second clutch operable to disconnect the motor from the second mechanical coupler responsive to the disconnect signal.

5. The combined active stick and control boost actuator system as defined in claim 3 further wherein the flight control system is further adapted to issue the disconnect signal responsive to a jam determination.

6. The combined active stick and control boost actuator system as defined in claim 5 wherein the input force signal exceeding a threshold results in the jam determination.

7. The combined active stick and control boost actuator system as defined in claim 5 further comprising a control surface force sensor providing a control surface force signal wherein a motor output current as indicated by the actuator position control signal exceeding a maximum anticipated control surface force signal plus a maximum anticipated input force signal results in the jam determination.

8. The combined active stick and control boost actuator system as defined in claim 1 wherein the integrated actuator comprises:
   at least one hydraulic cylinder having an actuation rod attached to a mechanical coupler connected to the mechanical interconnect; and,
   an electro hydraulic servo valve (EHV) receiving the actuator position control signal and controlling pressure from a hydraulic pump through a shutoff-bypass valve connected to the at least one hydraulic cylinder.

9. The combined active stick and control boost actuator system as defined in claim 8 wherein the integrated actuator further comprises a power control valve and a shutoff-bypass valve, said power control valve receiving the disconnect signal to releases pressure from the shutoff-bypass valve inducing transition from a normal operating position to a shutoff-bypass position thereby allowing free translation of the actuation rod within the at least one hydraulic cylinder.

10. The combined active stick and control boost actuator system as defined in claim 9 further comprising a second power control valve and a second shutoff-bypass valve, said second power control valve receiving a second disconnect signal and operable to releases pressure from the second shutoff-bypass valve inducing transition from a normal operating position to a shutoff-bypass position.

11. The combined active stick and control boost actuator system as defined in claim 9 wherein the at least one hydraulic cylinder comprises a first hydraulic cylinder and a second hydraulic cylinder, the EHV receiving a first actuator position control signal and controlling pressure from a first hydraulic pump through the shutoff-bypass valve connected to the first hydraulic cylinder and a second EHV receiving a second actuator position control signal and controlling pressure from a second hydraulic pump though a second bypass valve connected to the second hydraulic cylinder, a second power control valve and a second shutoff-bypass valve, said second power control valve receiving a second disconnect signal and operable to release pressure from the second shutoff-bypass valve inducing transition from a normal operating position to a shutoff-bypass position.

12. The combined active stick and control boost actuator system as defined in claim 1 further comprising an autopilot connected to provide an autopilot control input to the flight control system, said flight control system further adapted to provide the actuator position control signal to the integrated actuator responsive to the autopilot control input whereby said integrated actuator moves to the prescribed position.

13. The combined active stick and control boost actuator system as defined in claim 1 further comprising an unmanned air vehicle (UAV) controller connected to provide a UAV control input to the flight control system, said flight control system further adapted to provide the actuator position control signal to the integrated actuator responsive to the UAV control input whereby said integrated actuator moves to the prescribed position.

14. A combined active stick and control boost actuator system for a control surface, the system comprising:
   a control stick engaged to a mechanical flight control structure having a linkage configured to move the control surface;
   a mechanical interconnect to the linkage and having a control stick connection whereby motion of the control stick translates the mechanical interconnect;
   an integrated actuator separably connected to the mechanical interconnect intermediate the control stick connection and the linkage;
   a stick force sensor configured to provide an input force signal responsive to force exerted on the control stick;
   a flight control system receiving the input force signal and adapted to provide an actuator position control signal to the integrated actuator whereby said integrated actuator moves to a prescribed position in accordance with a force feel profile, said flight control system further adapted to provide a disconnect signal to the integrated actuator, said integrated actuator adapted to disconnect from the mechanical interconnect responsive to the disconnect signal and wherein the flight control system is further adapted to issue the disconnect signal responsive to a jam determination;
   an actuator position sensor providing an actuator position signal to said flight control system, said flight control system further adapted to close a position loop responsive to the actuator position signal; and
   an actuator force sensor and a control surface force sensor wherein comparison of output force of the integrated actuator as determined by the actuator force sensor and provided as an actuator force signal exceeding a sum of the input force signal and a control surface force as determined by the control surface force sensor and provided as a control surface force signal results in the jam determination.

15. The combined active stick and control boost actuator system as defined in claim 14 wherein the integrated actuator comprises an electric motor, said flight control system includes an actuator controller to provide the actuator position control signal and said actuator position control signal comprises a motor current.

16. The combined active stick and control boost actuator system as defined in claim 15 wherein the integrated actuator is connected to the mechanical interconnect with a mechanical coupler, and the integrated actuator further comprises a clutch intermediate the motor and mechanical coupler, said clutch operable to disconnect the motor from the mechanical coupler responsive to the disconnect signal.

17. A method for control of a control surface, the method comprising:
   sensing stick force applied to a stick connection on a mechanical interconnect with a stick force sensor;
   generating an input force signal from the stick force sensor;
   applying a force feel profile responsive to the input force signal;
   providing an actuator force feel position command;
   summing an actuator position signal with the actuator force feel position command to provide a position error command to an actuator controller;
   physically summing a torque or force output with a true control surface force and true stick force as carried in the mechanical flight control structure;
   outputting an actuator position control signal from the actuator controller;
   moving an integrated actuator connected to the mechanical interconnect intermediate the stick connection and the control surface responsive to the actuator position control signal, said integrated actuator providing a torque or force output to the mechanical interconnect;
   positioning the control surface with a mechanical flight control structure responsive to the torque or force output;
   providing an updated actuator position signal from an actuator position sensor to close a position loop.

18. The method as defined in claim 17 further comprising applying compensation to the input force signal using one or more of a stick position signal, a linkage position signal, a control surface force signal or an actuator output force signal through a compensation module.

19. The method as defined in claim 18 further comprising applying corrections through a simulated stick dynamics module and issuing an actuator dynamic position command prior to summing.

20. The method as defined in claim 17 further comprising:
   detecting a failure in the integrated actuator;
   issuing a disconnect signal; and
   disconnecting the integrated actuator from the mechanical interconnect.

* * * * *